Patented Sept. 26, 1950

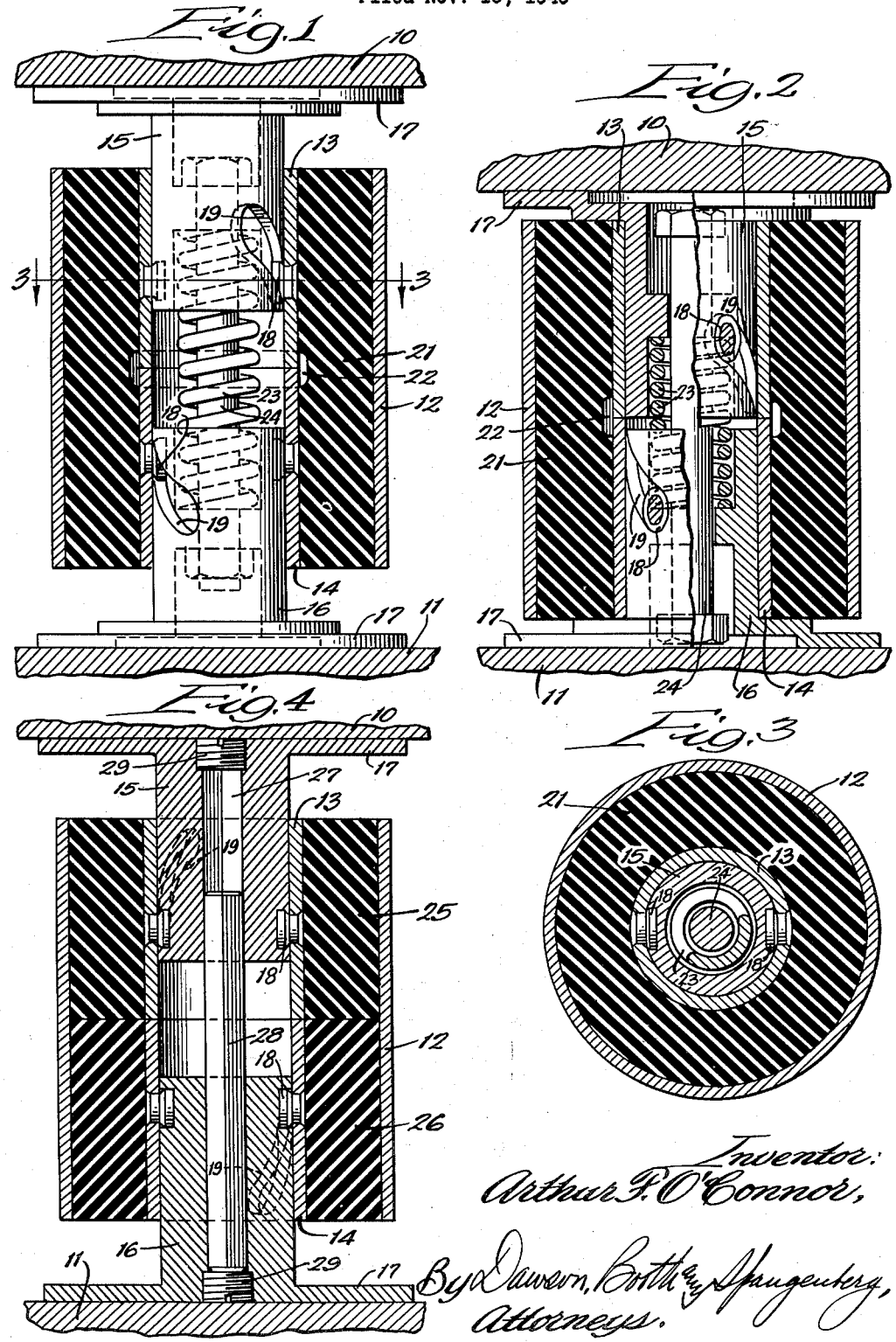

2,523,479

UNITED STATES PATENT OFFICE 2,523,479

SPRING DEVICE

Arthur F. O'Connor, Chicago, Ill., assignor to Union Asbestos & Rubber Company, a corporation of Illinois Application November 15, 1945, Serial No. 628,713

10 Claims. (Cl. 267—9)

This invention relates to spring device and more particularly to snubbers and the like for resiliently absorbing shock loads.

One of the objects of the invention is to provide a spring device which is simple and inexpensive to manufacture and which is small and compact for any given capacity.

Another object is to provide a spring device which resiliently opposes movement of the connected parts in either direction.

Still another object is to provide a spring device which produces a snubbing action to eliminate bouncing.

A further object is to provide a spring device in which shock loads are taken by rubber in shear through supporting members mounted for straight line movement.

The above and other objects and advantages of the invention will be more readily apparent from the following description when read in connection with the accompanying drawing, in which—

Figure 1 is an axial section with parts in elevation through a spring device embodying the invention in extended position;

Figure 2 is a view similar to Figure 1 showing the parts in collapsed position;

Figure 3 is a section on the line 3—3 of Figure 1; and

Figure 4 is a view similar to Figure 1 of an alternative construction.

The spring device as illustrated in Figures 1 and 2 is adapted to connect parts 10 and 11 which may, for example, be sprung and unsprung parts of a railroad car. The device is adapted to be inserted between the parts 10 and 11 in the place of the usual coil springs as employed on railroad cars, although it will be apparent that the device could be used in couplings and in connection with vehicles or mechanisms other than railroad cars.

The device itself, as shown, comprises an outer tubular housing 12 which may conveniently be a piece of steel tubing. Within the housing 12 and coaxial therewith there are arranged a pair of sleeves 13 and 14 of smaller diameter than the housing and in axial alignment. The sleeves receive plungers 15 and 16 respectively, which are carried by mounting plates 17 secured to the parts 10 and 11. Preferably, the mounting plates are bolted or otherwise rigidly fastened to the parts for movement therewith and so that they cannot rotate relative to the parts.

The sleeves 13 and 14 are connected respectively to the plungers 15 and 16 so that the sleeves will be turned in opposite directions as the plungers move together or apart. As shown, the sleeves carry studs or buttons 18, which project into the interiors of the sleeves and are received in spiral grooves 19 formed in the plungers. The grooves are preferably formed with the same hand so that when the plungers are moved together or apart the sleeves will turn in opposite directions.

Turning of the sleeves is resiliently opposed by resilient means connecting the sleeves to the housing. In the preferred construction, as shown, a tubular rubber body 21 is bonded to the interior of the housing and to the outer surfaces of the sleeves yieldingly to oppose turning of the sleeves in the housing. As shown in Figures 1 and 2, a single rubber body is provided, which is preferably cut out or relieved, adjacent the juncture of the sleeve as indicated at 22 to eliminate tearing.

With this structure, when the spring device is mounted as shown in Figure 1, the plungers are held against rotation relative to each other by their connection to the car parts. When a load is imposed on the device to move the plungers together as shown in Figure 2, the sleeves 13 and 14 will be turned in opposite directions. This turning is resisted by the rubber body 21 upon which the load is imposed in shear. As soon as the load is removed or decreased, the action of the rubber will return the sleeves to their initial position. Any tendency of the plungers to separate beyond their initial position will, however, be again resisted by the rubber, as the sleeves will be turned by either movement together or separation of the plungers. Due to this action and to the snubbing effect of the rubber, a smooth springing action is obtained without any tendency toward bouncing.

In handling the unit of Figures 1 and 2 prior to installation in a car, it is necessary to provide means to hold the plungers properly positioned with respect to each other since at this time the plungers may be free to turn. For this purpose a compression spring 23 is arranged between the plungers to urge them apart and a bolt 24 extends through openings in the plungers to limit their separation. Preferably the spring is set into sockets in the inner ends of the plungers so that they can move fully together, as shown in Figure 2. Similarly the ends of the bolt fit into sockets in the outer ends of the plungers so that the bolt will not project beyond the plungers when they are fully collapsed. With the spring and bolt installed the initial separation of the plungers is accurately determined so that the devices can be handled as units and when installed will have their parts in the proper relative positions.

Figure 4 illustrates an alternative arrangement for initially positioning the plungers, parts therein corresponding to like parts in Figures 1 to 3 being indicated by the same reference numerals. In this construction the sleeves 13 and 14 are connected to the housing 12 by separate tubular rubber bodies 25 and 26 bonded to the inner surface of the housing and to the sleeves 13 and 14 respectively. Each of the plungers is formed with a central non-circular opening 27 into which a correspondingly shaped rod 28 fits. The rod 28 is shorter than the combined lengths of the plungers when they are separated, so that when the plungers are moved together the rod will not project beyond the ends thereof. The rod may be held in place by plugs 29 threaded into the outer ends of the plungers.

With this construction the plungers are threaded into the sleeves until they are separated the desired distance, at which time the rod 28 is inserted in the openings 27 and the plugs 29 are attached. Since the rod 28 holds the plungers against relative rotation, any tendency of the plungers to move together or to separate is resisted by the rubber bodies 25 and 26, so that the device can be handled as a unit and can be installed with its parts in their proper relative positions.

Further, in the construction of Figure 4, when the plungers are moved relative to each other they cause the sleeves 13 and 14 to turn in opposite directions. Motion of the sleeves is resisted by the rubber bodies 25 and 26 respectively, so that operation of the construction is substantially the same as that of Figures 1 to 3.

While two embodiments of the invention have been shown and described in detail, it will be understood that they are illustrative only and are not intended to be a definition of the scope of the invention, reference being had for this purpose to the appended claims.

What is claimed is:

1. A spring device comprising a tubular integral housing, a sleeve of smaller diameter than the housing arranged centrally therein, the sleeve being rotatable relative to the housing but constrained against axial movement in the housing, a plunger slidable lengthwise into the sleeve in response to a load on the device, the sleeve and plunger being formed with cooperating parts to turn the sleeve when the plunger moves lengthwise, and a tubular rubber body bonded to the sleeve and the housing.

2. A spring device comprising a tubular housing, a pair of aligned relatively rotatable sleeves of smaller diameter than the housing, plungers fitting into the sleeves for lengthwise movement toward and away from each other, the sleeves and plungers being formed with cooperating parts to turn the sleeves relative to each other as the plungers are moved lengthwise, and means connecting the sleeves and the housing resiliently to resist turning of the sleeves relative to the housing.

3. A spring device comprising a tubular housing, a pair of aligned sleeves of smaller diameter than the housing, plungers fitting into the sleeves for lengthwise movement toward and away from each other, the sleeves and plungers being formed with cooperating parts to turn the sleeves as the plungers are moved lengthwise, and rubber bonded to the sleeves and the housing resiliently to resist turning of the sleeves in the housing.

4. A spring device comprising a tubular housing, a pair of aligned sleeves of smaller diameter than the housing, plungers fitting into the sleeves for lengthwise movement toward and away from each other, the sleeves and plungers being formed with cooperating parts to turn the sleeves as the plungers are moved lengthwise, and a single tubular body of rubber bonded to the sleeves and the housing, the rubber being relieved adjacent the juncture of the sleeves.

5. A spring device comprising a tubular housing, a pair of aligned sleeves of smaller diameter than the housing, plungers fitting into the sleeves for lengthwise movement toward and away from each other, the sleeves and plungers being formed with cooperating parts to turn the sleeves as the plungers are moved lengthwise, and separate tubular bodies of rubber bonded to the housing and to the respective sleeves.

6. A spring device comprising a tubular housing, a pair of aligned sleeves of smaller diameter than the housing, plungers fitting into the sleeves for lengthwise movement toward and away from each other, the sleeves and plungers being formed with cooperating parts to turn the sleeves as the plungers are moved lengthwise, rubber bonded to the sleeves and the housing resiliently to hold the sleeves against turning in the housing, and means connecting the plungers initially to hold them a predetermined distance apart.

7. A spring device comprising a tubular housing, a pair of aligned sleeves of smaller diameter than the housing, plungers fitting into the sleeves for lengthwise movement toward and away from each other, the sleeves and plungers being formed with cooperating parts to turn the sleeves as the plungers are moved lengthwise, rubber bonded to the sleeves and the housing resiliently to hold the sleeves against turning in the housing, a spring between the plungers urging them apart, and a tie bolt connecting the plungers to limit separation thereof.

8. A spring device comprising a tubular housing, a pair of aligned sleeves of smaller diameter than the housing, plungers fitting into the sleeves for lengthwise movement toward and away from each other, the sleeves and plungers being formed with cooperating parts to turn the sleeves as the plungers are moved lengthwise, rubber bonded to the sleeves and the housing resiliently to hold the sleeves against turning in the housing, and means connecting the plungers to prevent relative rotation thereof while permitting relative lengthwise movement.

9. A spring device comprising a pair of aligned relatively rotatable sleeves, plungers engaging the sleeves for lengthwise movement toward and away from each other, cooperating parts on the sleeves and plungers to turn the sleeves relative to each other as the plungers are moved lengthwise, and resilient means connecting the sleeves resiliently to resist relative rotation thereof.

10. A spring device comprising a pair of aligned relatively rotatable sleeves, plungers engaging the sleeves for lengthwise movement toward and away from each other, cooperating parts on the sleeves and plungers to turn the sleeves relative to each other as the plungers are moved lengthwise, and a tubular body of rubber bonded to the sleeves to resist relative rotation thereof.

ARTHUR F. O'CONNOR.

(References on following page)

REFERENCES CITED

The following references are of record in the file of this patent:

UNITED STATES PATENTS

| Number | Name | Date |
|---|---|---|
| 845,149 | Wands | Feb. 26, 1907 |
| 1,519,831 | Goodwin | Dec. 16, 1924 |
| 1,685,176 | O'Connor | Sept. 25, 1928 |
| 2,000,905 | Rockefeller | May 14, 1935 |
| 2,191,211 | Krotz | Feb. 20, 1940 |
| 2,216,455 | Piron | Oct. 1, 1940 |

FOREIGN PATENTS

| Number | Country | Date |
|---|---|---|
| 144,097 | Austria | Dec. 27, 1935 |